(12) United States Patent
Lang et al.

(10) Patent No.: US 6,669,348 B2
(45) Date of Patent: Dec. 30, 2003

(54) LIGHTWEIGHT REARVIEW MIRROR ASSEMBLY

(75) Inventors: Heinrich Lang, Ergersheim (DE); Albrecht Popp, Weihenzell (DE)

(73) Assignee: Lang-Mekra North America, LLC, Ridgeway, SC (US)

( * ) Notice: Subject to any disclaimer, the term of this patent is extended or adjusted under 35 U.S.C. 154(b) by 77 days.

(21) Appl. No.: 10/043,080

(22) Filed: Jan. 9, 2002

(65) Prior Publication Data

US 2002/0109927 A1 Aug. 15, 2002

Related U.S. Application Data

(62) Division of application No. 09/652,297, filed on Aug. 29, 2000, now Pat. No. 6,481,862.

(30) Foreign Application Priority Data

May 5, 2000 (DE) .......................................... 100 22 016

(51) Int. Cl.[7] ............................................. G02B 7/182
(52) U.S. Cl. ....................... 359/871; 359/872; 359/873; 359/874
(58) Field of Search .................. 359/871, 872, 359/873, 874, 841, 850, 877, 854, 857; 248/479, 481, 482

(56) References Cited

U.S. PATENT DOCUMENTS

| | | |
|---|---|---|
| 2,652,648 A | 9/1953 | Morley |
| 2,783,015 A | 2/1957 | Kampa |
| 3,189,309 A | 6/1965 | Hager |
| 3,291,435 A | 12/1966 | Herr |
| 3,339,876 A | 9/1967 | Kampa |
| 3,346,229 A | 10/1967 | Carson, Jr. |
| 3,371,903 A | 3/1968 | Thompson |
| 3,372,897 A | 3/1968 | Lee |
| 3,375,053 A | 3/1968 | Ward |
| 3,383,152 A | 5/1968 | Ward |
| 3,408,136 A | 10/1968 | Travis |
| 3,448,553 A | 6/1969 | Herr et al. |
| 3,476,464 A | 11/1969 | Clark |
| 3,508,815 A | 4/1970 | Scheitlin et al. |
| 3,522,584 A | 8/1970 | Talbot |
| 3,563,638 A | 2/1971 | Panozzo |
| 3,659,929 A | 5/1972 | Yuzawa |
| 4,174,823 A | 11/1979 | Sutton |
| 4,488,778 A | 12/1984 | Polzer et al. |
| 4,517,151 A | 5/1985 | Masumoto et al. |
| 4,740,068 A | 4/1988 | Fisher |
| 4,747,679 A | 5/1988 | Beach, Jr. |
| 4,883,349 A | 11/1989 | Mittelhauser |

(List continued on next page.)

FOREIGN PATENT DOCUMENTS

| | | |
|---|---|---|
| CA | 1095008 | 2/1981 |
| DE | 2537876 A1 | 3/1977 |
| DE | 2703105 | 8/1977 |
| DE | 2820883 A1 | 11/1979 |
| DE | 2660184 C2 | 3/1983 |

(List continued on next page.)

OTHER PUBLICATIONS

European Search Report, dated Mar. 7, 2002 with English Language translation.
German Search Report, May 10, 2001.
DE 197 11 547 corresponding to USSN 09/045,098 (LMX–45) dated Mar. 21, 1997.
Verified English translation of EP 0761502, dated Mar. 12, 1997.
DE 44 29 604 A1 corresponding to USSN 08/804,205 dated Feb. 22, 1996.

*Primary Examiner*—Mohammad Sikder
(74) *Attorney, Agent, or Firm*—Dority & Manning, P.A.

(57) ABSTRACT

A rearview mirror assembly blowmolded carrier for vehicles and method of blowmolding the carrier are provided. The mirror assembly has a blowmolded carrier with a hollow space and a recess to affix a mirror element.

13 Claims, 5 Drawing Sheets

U.S. PATENT DOCUMENTS

| | | |
|---|---|---|
| 4,915,493 A | 4/1990 | Fisher et al. |
| 4,929,074 A | 5/1990 | Urban |
| 4,957,359 A | 9/1990 | Kruse et al. |
| 4,988,178 A | 1/1991 | Eifert |
| 5,107,374 A | 4/1992 | Lupo et al. |
| 5,225,943 A | 7/1993 | Lupo |
| 5,268,795 A | 12/1993 | Usami |
| 5,295,021 A | 3/1994 | Swanson |
| 5,327,294 A | 7/1994 | Koske et al. |
| 5,493,828 A | 2/1996 | Rogowsky et al. |
| 5,576,884 A | 11/1996 | Ise et al. |
| 5,604,644 A | 2/1997 | Lang et al. |
| 5,615,054 A | 3/1997 | Lang et al. |
| 5,621,577 A | 4/1997 | Lang et al. |
| 5,657,174 A | 8/1997 | Boddy |
| 5,721,646 A | 2/1998 | Catlin et al. |
| 5,760,980 A | 6/1998 | Lang |
| 5,786,948 A | 7/1998 | Gold |
| 5,880,895 A | 3/1999 | Lang et al. |

FOREIGN PATENT DOCUMENTS

| | | |
|---|---|---|
| DE | 19530913 A1 | 2/1997 |
| EP | 0590510 | 4/1994 |
| EP | 0761502 | 3/1997 |
| EP | 0865967 | 9/1998 |
| FR | 2633568 A1 | 7/1988 |
| WO | WO 0046072 | 8/2000 |

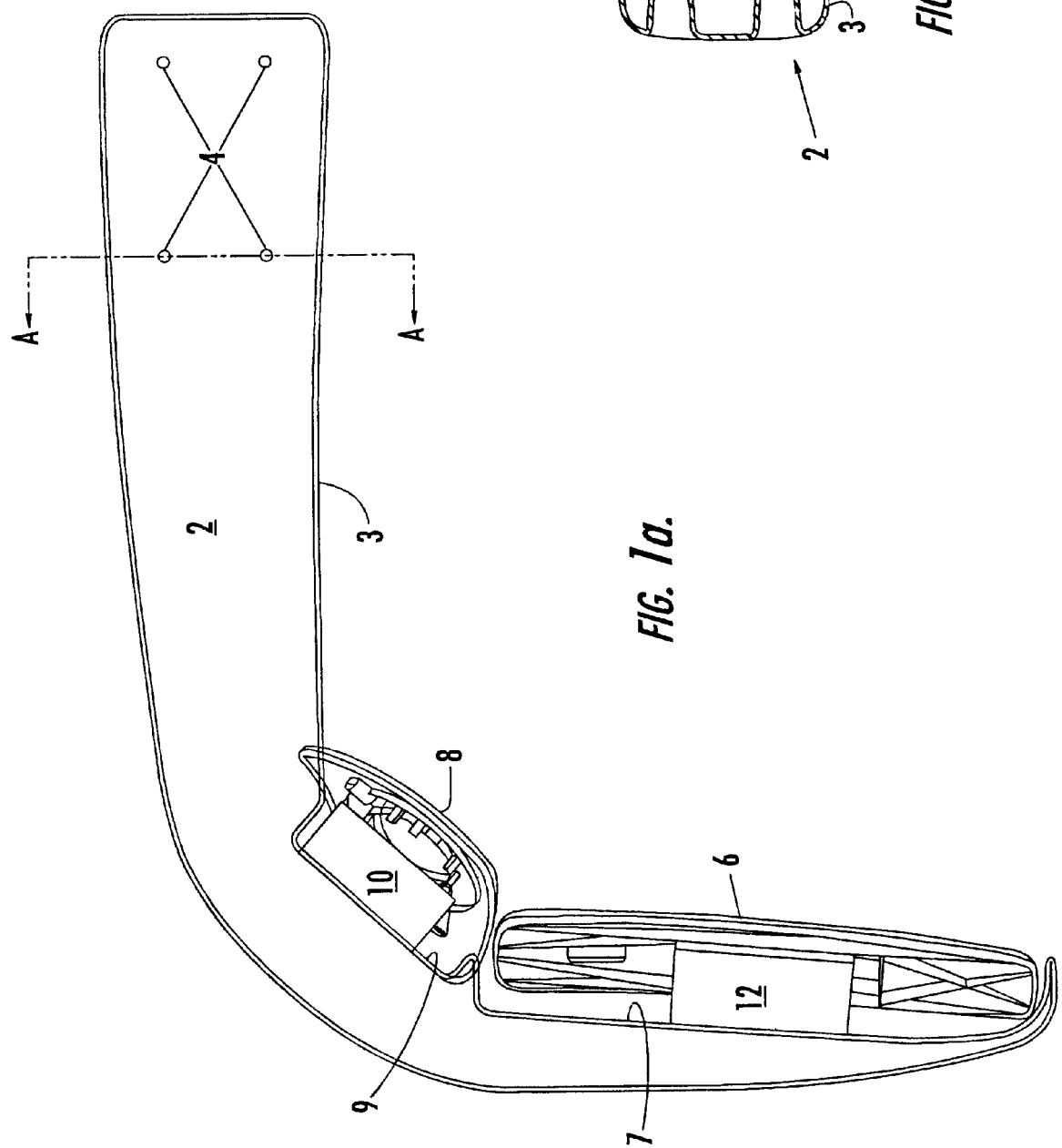

LIGHTWEIGHT REARVIEW MIRROR ASSEMBLY

RELATED APPLICATIONS

The present application is a divisional of U.S. patent application Ser. No. 09/652,297, filed Aug. 29, 2000 now Pat. No. 6,481,862, claiming priority under 35 U.S.C. §119 to Patent Application DE 10022016.9 filed May 5, 2000 in the German Patent Office.

BACKGROUND OF THE INVENTION

The invention concerns a rearview mirror arrangement, especially a lightweight mirror assembly for commercial vehicles.

Outside mirrors of this kind and of variously different construction are already known in the present state of the technology. A mirror pane is adjustably affixed by a pivoting mechanism to a housing part, which part is appropriately connected to the body of the vehicle, allowing the mirror to swing in reference to the housing part. The housing part is, as a rule, a solid plastic part, produced by injection molding. It is generally of a basin-like construction in which further mirror components or corresponding connection points for additions are installed. In particular, for large truck and bus mirrors, the carrying structure for outside mirrors is based on tubing or plates, which are affixed directly to the mirror holder which projects toward the vehicle body. This construction is disclosed by EP-A-0 590 510. The housing part serves then as a covering of the back side of the mirror plate and supports the pivoting mechanism. The housing also provides a streamlined sheathing of the outside mirror. Such construction is extremely expensive and heavy.

A problem with this tube and plate construction is that relatively strong vibrations occur in the rearview mirror assembly during the operation of the vehicle. In order to reduce these vibrations, EP 0 865 967 A2 proposes a carrying tube structure encased in a foamed molded part. Again, the disadvantage of this is that the entire carrying structure is heavy.

A very light design, which is adaptable to smaller mirrors, is taught by DE 44 29 604 A1. In this case, the tube construction is fully dispensed with and the foam element itself remains as the support structure. For this purpose, a gradiated foam is employed as a one-piece element or the element can be composed of several shells.

OBJECTIVES AND SUMMARY OF THE INVENTION

It is thus the objective of the present invention to make available a sufficiently stable rearview mirror which also offers the greatest possible reduction in vibration.

The achievement of this objective is accomplished by the features of the invention.

Since a blown, hollow plastic body, originating from a plastic blank, is used as a carrier, the result is a very light structure so that even in the case of a cantilevered mirror, or outboard carrier construction, the basic rigidity of the plastic hollow body assures a sufficient stability. At first, it appears doubtful that a blown plastic hollow body would exhibit sufficient stability to be used as a carrier for a rearview mirror arrangement for commercial vehicles. However, by means of the substantial reduction in the weight, the demands for achieving stability are likewise reduced, so that a blown plastic hollow body does indeed offer sufficient stability.

Because of the fact that the plastic blank is made with varying wall thicknesses, the corresponding wall thickness of the finished carrier, that is, the plastic hollow body, can be controlled to specification for location and thickness. That is, the wall thicknesses of the carrier is increased in locations of high stress, i.e. at the point of juncture with the vehicle body, while the thicknesses in zones of lesser stress may be reduced. Also, a grid-like rib structuring on the inner side of the plastic hollow body may be used to increase rigidity.

In accord with a further advantageous embodiment of the invention, the plastic hollow body encompasses a multitude of hollow spaces, which are enhanced by, for instance, inset pieces or correspondingly designed bubble formations. By these measures, the stability is additionally increased and also the possibility exists to fill specified hollow spaces with filling materials.

In accord with another advantageous embodiment of the present invention, the plastic hollow body is constructed in multiple layers, whereby, first, an increased stability is achieved, and second, outer layers can be provided, which are especially smooth and/or acceptable for high quality lacquering.

In accord with a further advantageous embodiment of the invention, the possibility exists of introducing, either in or to the hollow spaces, a stiffening structure whereby the rigidity of the carrier is additionally increased.

In accord with a further advantageous embodiment of the invention, a filling material for the hollow spaces comprises plastic foam, such as polyurethane (PU) foam, a gradient foam or a multi-component hard foam, which binds itself firmly to the inside wall of the hollow spaces and thus increases the stability of the carrier. Moreover, the harmonic vibratory properties of the carrier can be advantageously addressed by the appropriate choice of foam density or its degree of softness, so that during commercial driving the unavoidable vibrations are strongly damped and also as a result, less wear on the mirror assembly is incurred.

Additionally or alternatively, there may be injected into a portion of the hollow spaces, or into various hollow spaces, a viscous fluid mass, for instance a gel or a gelatinous filling material which will also favorably affect specific vibratory and damping characteristics.

In accord with a further advantageous embodiment of the invention, a granulate and/or sand may additionally or alternatively be placed in the hollow spaces. In this way, the fill material can comprise exclusively sand or granulate, or a mixture thereof, or yet a mixture with the above described gel, gelatine or foam. Once again, the stability is favored in a positive way and again the specific vibratory and damping characteristics can be advantageously controlled with attention to specifics.

BRIEF DESCRIPTION OF THE DRAWINGS

Further details, features and advantages of the invention will become evident from the following description of a preferred embodiment. The description is made with the aid of the drawings. There is shown in:

FIG. 1a a schematic sideview of a first embodiment of the invention with a carrier in the form of a blown plastic hollow body with a single, continuous hollow space, FIG. 1b a sectional view along the line A—A of FIG. 1a, FIG. 2a a perspective view of a second embodiment of the invention, with a rearview mirror, which possesses a carrier in the form of two bearing arms, FIG. 2b a sectional view along the line B—B of FIG. 2a, FIG. 3 a schematic sideview of a third embodiment of the invention with a carrier in the form of a plastic, hollow body with a multitude of hollow spaces, and FIG. 4 a partial sectional view of a fourth embodiment of the invention with a carrier comprised of a blown plastic hollow body with added elements for rigidity.

DESCRIPTION OF THE PREFERRED EMBODIMENT

Figure 2A:
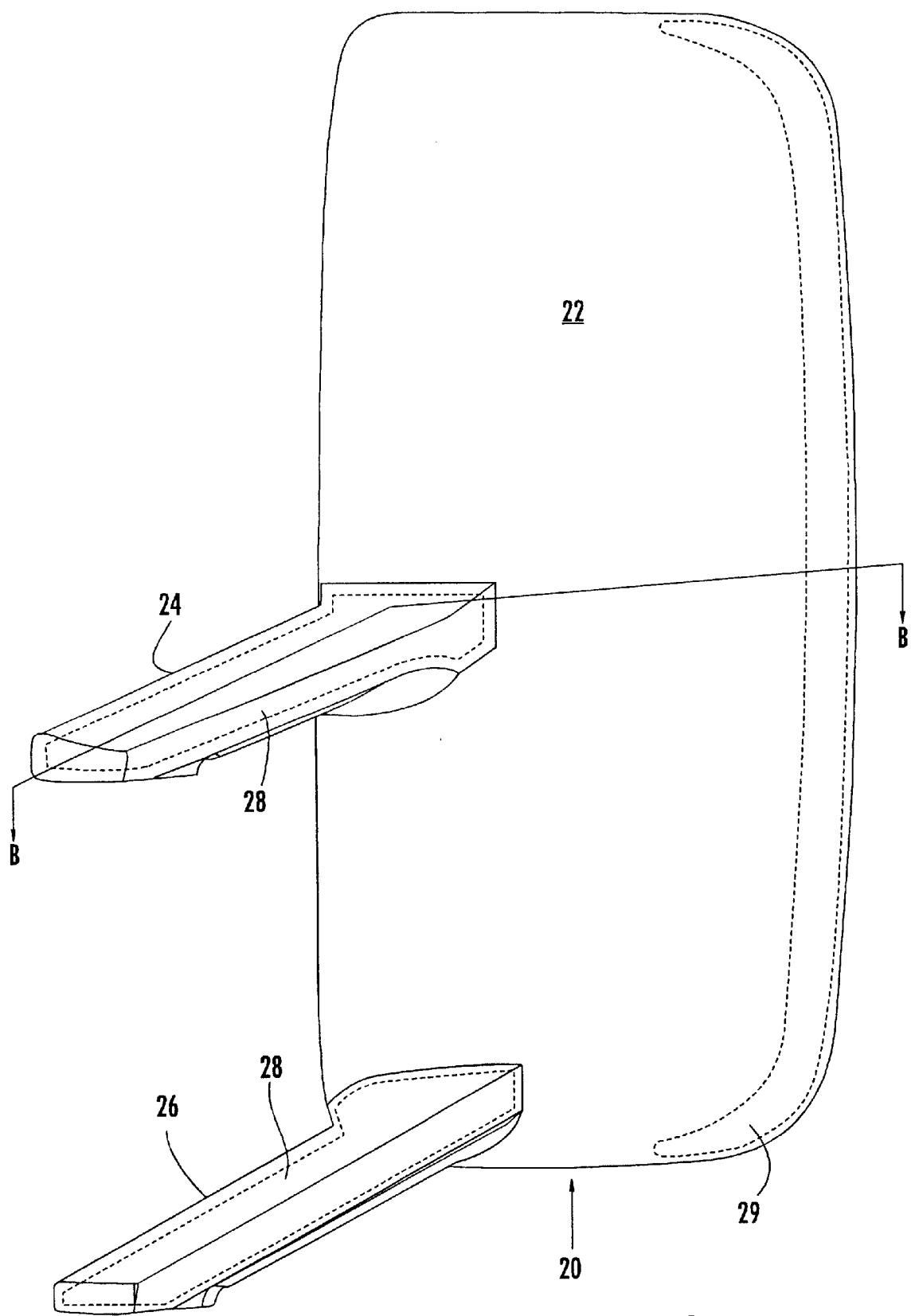

Reference will now be made in detail to the presently preferred embodiment of the present invention, examples of which are illustrated in the drawings. The examples are provided by way of explanation of the invention and are not meant as a limitations of the invention. For example, features illustrated or described as part of one embodiment can be used on another embodiment to yield yet a third embodiment. Accordingly, it is intended that the present invention include such modifications and variations.

FIGS. 1a and 1b schematically present a first embodiment of the invention. The rearview mirror arrangement encompasses a carrier 2 in the form of a plastic hollow body 2, blown from an extruded plastic blank and having a closed wall 3. On the vehicle end of the plastic hollow body 2, screw holes 4 are provided, in order to affix the carrier 2, i.e., the rearview mirror arrangement, to the vehicle body. On the distal end of the plastic hollow body 2 remote from the vehicle, a first mirror 6 and a second mirror 8 are mounted in respective recesses 7 and 9. Both mirrors, 6 and 8 include, respectively, an adjusting mechanism 10 and 12, by means of which the mirrors are secured to the plastic hollow body 2. The wall 3 of the plastic hollow body 2 is thicker at locations of higher stress than at locations of more moderate stress (not shown).

Figure 2B:
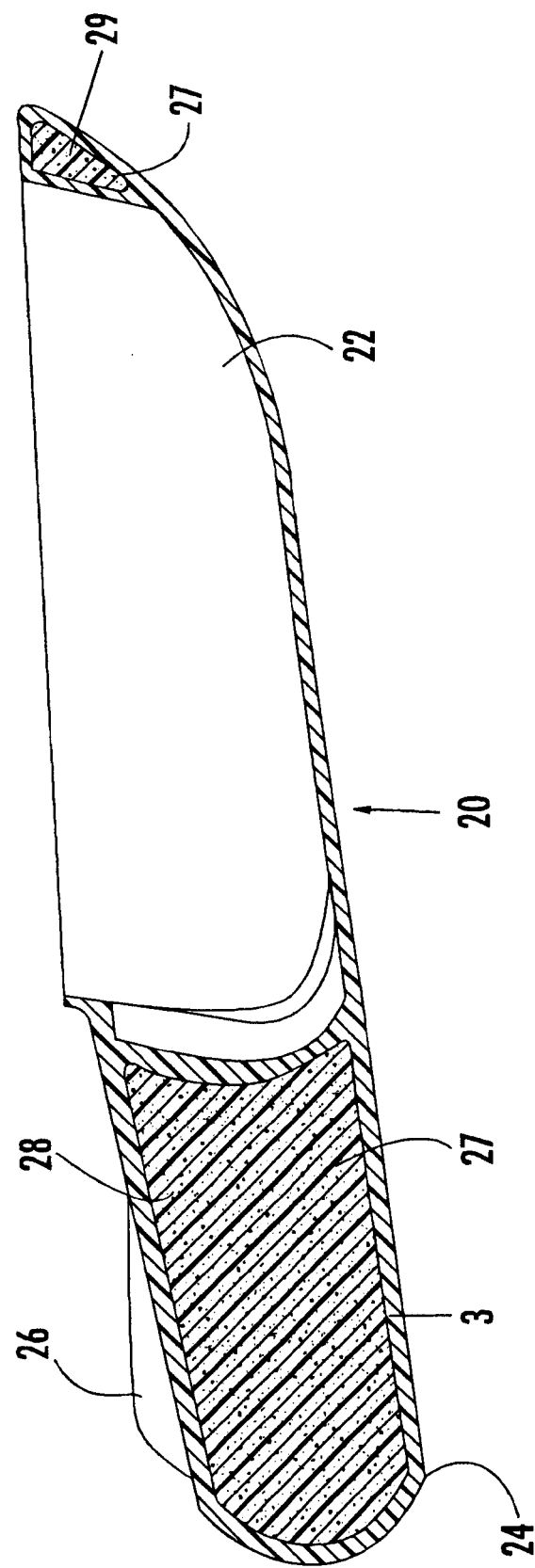

The FIGS. 2a and 2b show a second embodiment of the invention with a carrier 20 in the form of a hollow plastic body. The hollow plastic body 20 includes a shell shaped mirror housing 22 and two carrier arms, respectively 24 and 26, which are of one piece with the mirror housing 22. The two carrier arms 24 and 26 are hollow, and exhibit respectively a hollow space 28 which is filled with filling material 27. Preferably polyester urethane foam, gradient foam, multi-component foam and the like may be used as the filling material 27. The carrier 20 possesses, on the distal end of the mirror housing remote from the vehicle, an additional hollow space 29, the interior of which, likewise is filled with foam 27. By filling the hollow spaces 28 and 29 with foam 27, first, the stability is improved, since the foam binds itself to the interiors of the walls in the hollow spaces 28 and 29, that is, adheres to the walls. Second, because of the foam the vibratory characteristics are positively influenced, that is, the vibration is damped.

Figure 3:
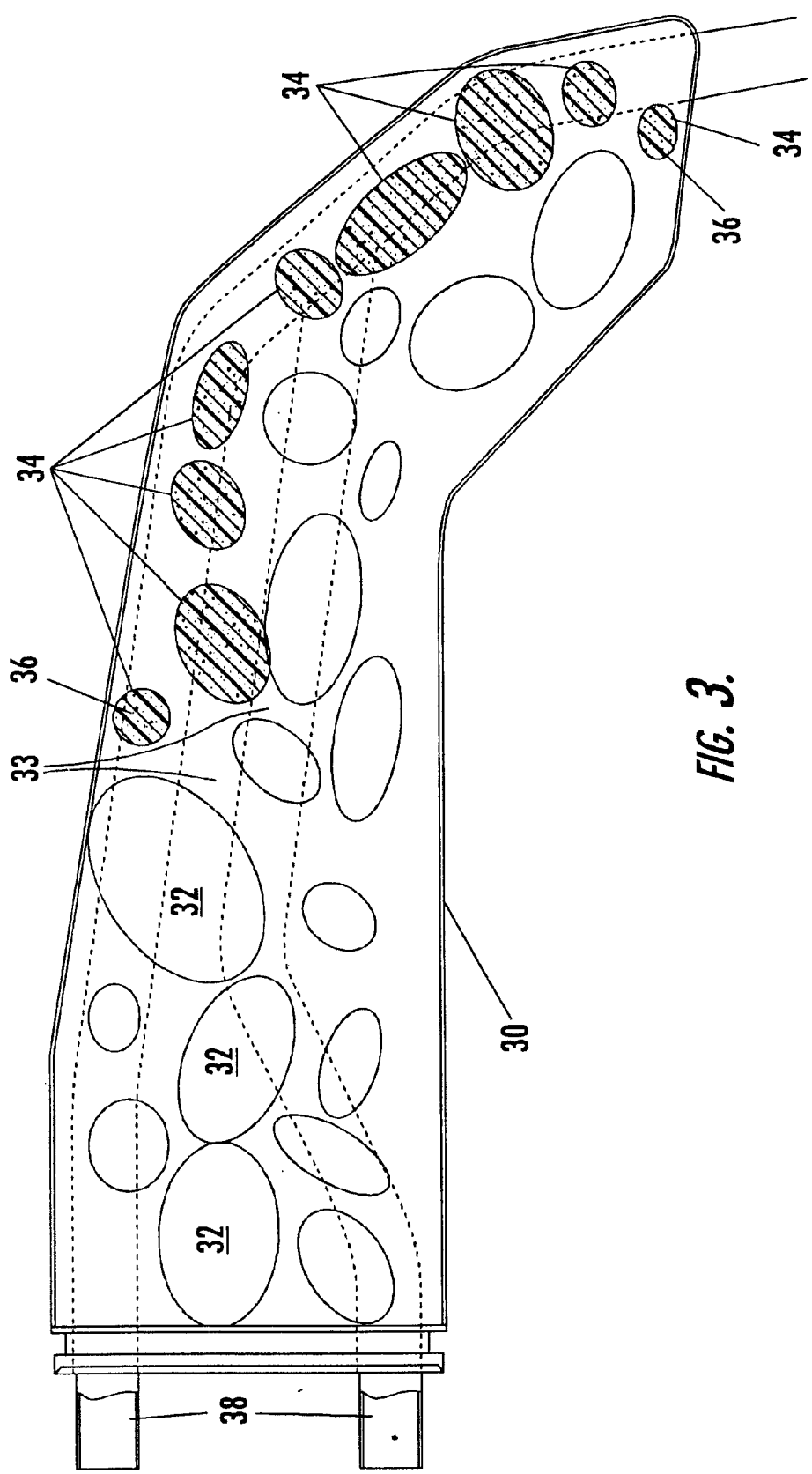

FIG. 3 shows a third embodiment of the invention with a carrier 30 in the form of a hollow plastic body, wherein the hollow plastic body exhibits a plurality of bubble shaped hollow spaces 32 and 34. In this case, the bubble shaped hollow spaces 32 are empty, while the bubble shaped hollow spaces 34 are at least partially filled with a filling material 36. Because of the plurality of the hollow spaces 32, 34, first, the weight is reduced and second, by means of the dividing walls 33 between the hollow spaces 32, 34, the stability is increased. By filling of a portion of the hollow spaces, namely the hollow spaces 34, with a filling material 36, the vibratory properties of the mirror assembly are influenced in such a way, that less vibration occurs, that is to say, the vibrations are damped. Additionally, in the case of the third embodiment, carrier arms 38 are constructed of metal, by means of which the stability of the carrier 30 is additionally increased.

Figure 4:
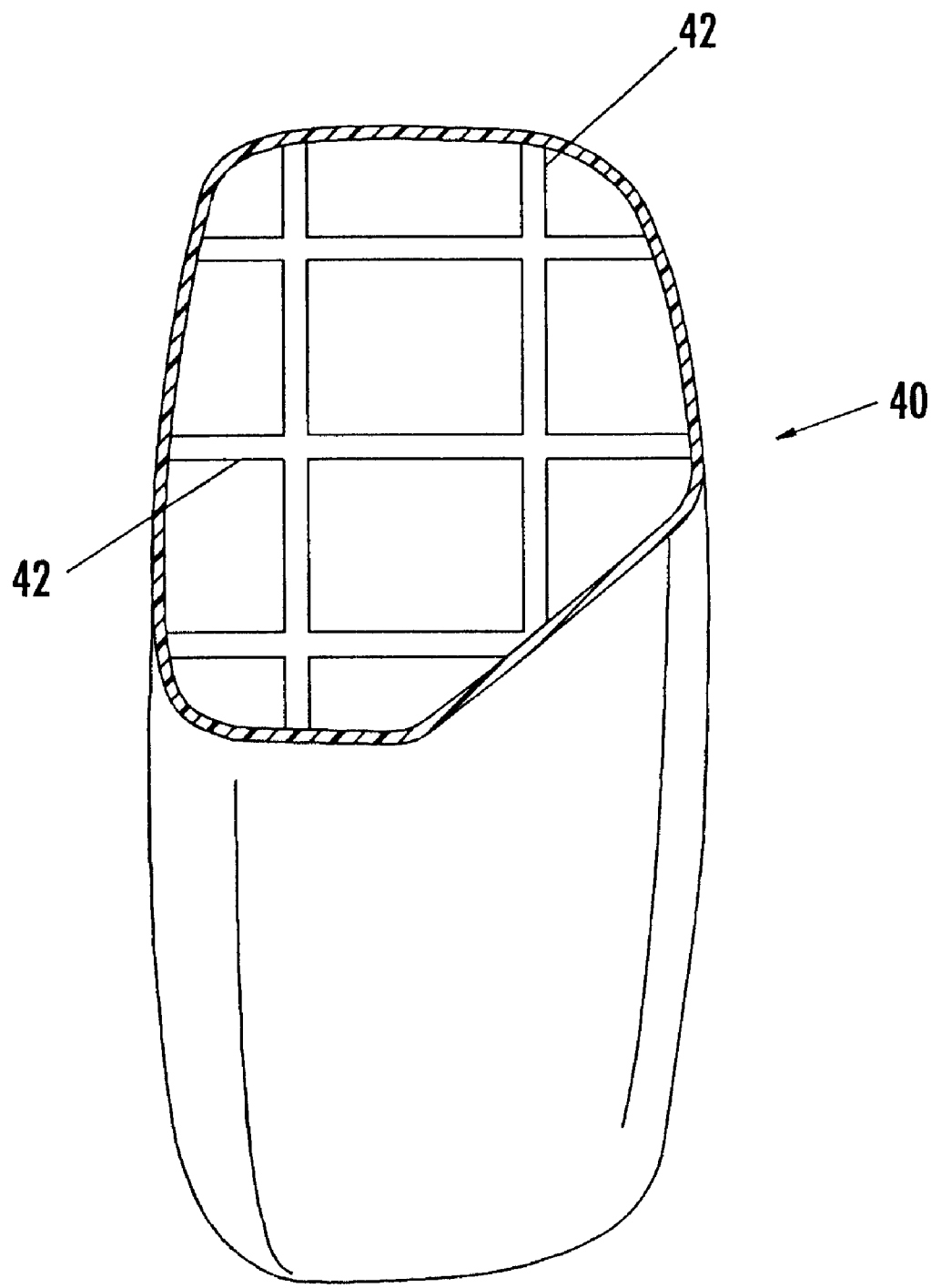

FIG. 4 shows a fourth embodiment of the invention, with a carrier 40 in the form of a plastic hollow body, by which on the interior walls of the plastic hollow body 40, grid type stiffening ribs 42 are provided. These grid shaped, stiffening ribs 42 can be made by providing correspondingly different wall thicknesses in the plastic blank before the blowing of body in the blow mold. The grid shaped stiffening ribs 42 also contribute to the increase of the stability of the carrier 30.

It will be apparent to those skilled in the art that various modifications and variations can be made in the present invention without departing from the scope and spirit of the invention. It is intended that the present invention includes such modifications and variations as come within the scope of the appended claims and their equivalents.

What is claimed is:

1. A method of manufacturing a rearview mirror assembly for a vehicle, comprising the steps of:

providing a blank to be melted;

heating the blank to form a molten blank;

forcing air into the molten blank to form a blowmolded carrier having a hollow space therein and a unitary wall;

cooling the blowmolded carrier to achieve form stability; and attaching a mirror element to the blowmolded carrier to form the rearview mirror assembly.

2. The method of claim 1, further comprising forming the wall to have a recess thereon to attach a mirror to the blowmolded carrier.

3. The method of claim 2, wherein the forming of the carrier, the hollow space, and recess are performed in the same step.

4. The method of claim 1, further comprising the step of providing the blank with varying thicknesses to achieve varying thicknesses in the carrier wall.

5. The method of claim 1, further comprising the step of forming the wall with multiple layers.

6. The method of claim 1, wherein the blank is plastic.

7. The method of claim 1, wherein the mirror element comprises a mirror and an adjusting mechanism for adjusting the mirror, the method further comprising attaching the adjusting mechanism to the blowmolded carrier and attaching the mirror to the adjusting mechanism.

8. A method of manufacturing a carrier for an external vehicle device, comprising the steps of:

providing a plastic blank to be melted;

heating the blank to form a molten blank;

forcing air into the molten blank to form a blowmolded carrier having a hollow space therein and a unitary wall;

installing a stiffening frame in the space affixed to the blowmolded carrier;

cooling the blowmolded carrier to achieve form stability;

injecting a fill material in the space to encapsulate the stiffening frame; and affixing the device to the blowmolded carrier to form the external vehicle device.

9. The method of claim 8, wherein the forming of the blowmolded carrier and the hollow space are performed in the same step.

10. The method of claim 8, further comprising the step of providing the blank with varying thicknesses to achieve varying thicknesses in the carrier wall.

11. The method of claim 8, wherein the fill material is gradient plastic foam and further comprising the step of injecting the foam at a vibratory reducing location within the carrier.

12. The method of claim 8, further comprising the step of forming a dividing wall and a bubble space within the hollow space.

13. The method of claim 12, further comprising the step of injecting the bubble space with the fill material.

* * * * *